(12) United States Patent
Sommerville

(10) Patent No.: US 10,679,525 B1
(45) Date of Patent: Jun. 9, 2020

(54) SOLAR-POWERED ATTENTION SIGN

(71) Applicant: Jerry Neal Sommerville, Rancho Cucamonga, CA (US)

(72) Inventor: Jerry Neal Sommerville, Rancho Cucamonga, CA (US)

( * ) Notice: Subject to any disclaimer, the term of this patent is extended or adjusted under 35 U.S.C. 154(b) by 0 days.

(21) Appl. No.: 16/452,525

(22) Filed: Jun. 26, 2019

Related U.S. Application Data

(60) Provisional application No. 62/819,545, filed on Mar. 16, 2019.

(51) Int. Cl.
  *G09F 7/18* (2006.01)
  *H02S 20/10* (2014.01)
  *G09F 19/02* (2006.01)
  *G09F 7/22* (2006.01)

(52) U.S. Cl.
  CPC ............... *G09F 7/18* (2013.01); *G09F 7/22* (2013.01); *G09F 19/02* (2013.01); *H02S 20/10* (2014.12)

(58) Field of Classification Search
  USPC .................................................. 40/423, 424
  See application file for complete search history.

(56) References Cited

U.S. PATENT DOCUMENTS

| | | | |
|---|---|---|---|
| 2,245,940 A | 6/1941 | Seares | |
| 2,528,962 A | 11/1950 | Lieutard | |
| 2,557,242 A * | 6/1951 | Simpson | G09F 11/23 40/423 |
| 2,817,916 A * | 12/1957 | Allen | G09F 11/23 40/614 |
| 3,888,030 A * | 6/1975 | Bradt | G09F 19/02 40/411 |
| 5,823,844 A * | 10/1998 | Markowitz | A01K 15/025 446/175 |
| 6,101,750 A | 8/2000 | Blesener et al. | |
| 7,317,405 B2 * | 1/2008 | Green | B29C 39/10 116/63 R |
| 7,895,779 B2 * | 3/2011 | Schnuckle | A63H 13/02 119/708 |
| 8,887,424 B2 | 11/2014 | Adams et al. | |
| 9,299,276 B1 | 3/2016 | Enrico | |
| 2012/0047781 A1 | 3/2012 | Wondra et al. | |
| 2013/0185967 A1 * | 7/2013 | Adams | G09F 7/22 40/218 |

* cited by examiner

*Primary Examiner* — Kristina N Junge
(74) *Attorney, Agent, or Firm* — Kirk A. Buhler; Buhler & Associates

(57) ABSTRACT

A solar-powered device that moves advertising signs to attract attention of passersby is disclosed. The Solar panels makes the solar sign spinner independent of the electrical grid. It moves from a power source that is free. This gives it the freedom to be used in remote locations. The lack of dependency on the power grid makes the device easy to transport to remote locations. The solar sign spinner can operate as long as there is sunshine. If it happens to stop motion due lack of sunlight, it becomes a garden variety "yard" sign.

19 Claims, 4 Drawing Sheets

SOLAR-POWERED ATTENTION SIGN

CROSS REFERENCE TO RELATED APPLICATION

This application claims the benefit of Provisional Application Ser. No. 62/819,545 filed Mar. 16, 2019 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a signage. More particularly, the present solar powered attention sign allows a company to advertise their business or service with a moving sign that does not require manual labor, wind or electrical power to create the motion to attract the attention of people.

Description of Related Art Including Information Disclosed Under 37 CFR 1.97 and 1.98

Many businesses or people have a need to advertise, promote or give directions. One common method is with fixed signs that are secured into the ground. While the fixed signs provide advertising or directions there is no motion that draws attention to the sign and encourages people to pay attention to the sign. Message signs are another mechanism, but message signs can be expensive and difficult to program. Another common way is to use a human that spins a sign. This requires a person to stand outside on hot days while they move or spin a sign. Human sign spinners are subject to repetitive motion injuries, physical exhaustion, diminishing morale, and boredom as the human counterpart. Human sign spinners are expensive and are prone to injury, and need frequent restroom and food breaks.

A number of patents and or publications have been made to address these issues. Exemplary examples of patents and or publication that try to address this/these problem(s) are identified and discussed below.

U.S. Pat. No. 9,299,276 issued on Mar. 29, 2016 to Richard H. Enrico and is titled Mobile Motionable Sign Apparatus. This patent discloses a mobile motionable sign apparatus for supporting and moving a sign relative to the base apparatus. The mobile motionable sign apparatus includes a base assembly including a base member with wheels mounted thereto; a motive support assembly removably coupled to the base member and including a pivot member; and a sign support assembly movably coupled to the pivot member and including a motor support member coupled and movable relative to the pivot member and further including a motor mounted to the motor support member and also including sign support members connectable to the motor support member. The sign in this patent only covers a rocking motion and is not solar powered.

U.S. Pat. No. 8,887,424 issued on Nov. 18, 2014 to Scott Adams et al., and is titled Mechanical Sign Waving Device. This patent discloses a sign waving apparatus that includes a base, a housing enclosing a motor, a frame support connecting the base and the housing, and a sign mount mechanically connected to a motor. The sign or signs attach to the surfaces of the sign mount. The sign mount moves relative to the housing in a variety of different motions. The sign motion is limited to a similar rocking motion and required external power.

U.S. Published application 20120047781 was published on Mar. 1, 2012 to Karl Wondra et al., and is titled Motorized Automatic Sign Waving Figure. This patent discloses a simulated human form figure, such as a mannequin, which is standing on a wheeled box base, with the hands affixed to a business advertising sign positioned in the direction of passers-by such as on a sidewalk or roadway. The base box contains a battery-operated motor that is connected to the motor mounted in back of the sign so that the arms of the figure will move in a "waving" motion to automatically wave the sign without human intervention. While the waving figure is in the shape of a person the apparatus is not solar powered to provide directions or advertising.

What is needed is a sign that has motion to catch the attention of people that can see the sign. The solar powered attention sign in this document provides a solution without requiring a user or external power.

BRIEF SUMMARY OF THE INVENTION

It is an object of the solar powered attention sign to replace the human sign spinner because it performs the same work as human sign spinners without being subject to repetitive motion injuries, physical exhaustion, diminishing morale, and boredom as the human counterpart. Human sign spinners are expensive and are prone to injury, and need frequent restroom and food breaks.

It is another object of the solar powered attention sign to provide motion of advertising signs without requiring batteries or electrical cords. The solar panel makes the solar sign spinner independent of the electrical grid. The direction of the solar panel is adjustable separate from the sign to provide optimal sun exposure. The sign moves from a power source that is free. This gives it the freedom to be used in remote locations. The lack of dependency on the power grid makes the device easy to transport to remote locations. The solar sign spinner can operate as long as there is sunshine. If it happens to stop motion due lack of sunlight, it becomes a garden variety "yard" sign.

It is another object of the solar powered attention sign to include a drive motor with a wheel that drives an arm that follows within a track. The track provides a motion to an attached sign. The track can be fabricated to impart a variety of motions.

It is still another object of the solar powered attention sign for the sign to be replaceable or customizable to suit the needs of the owner. In a standard version the sign can be a simple arrow or can provide an image or text to provide information on the product, service or direction.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
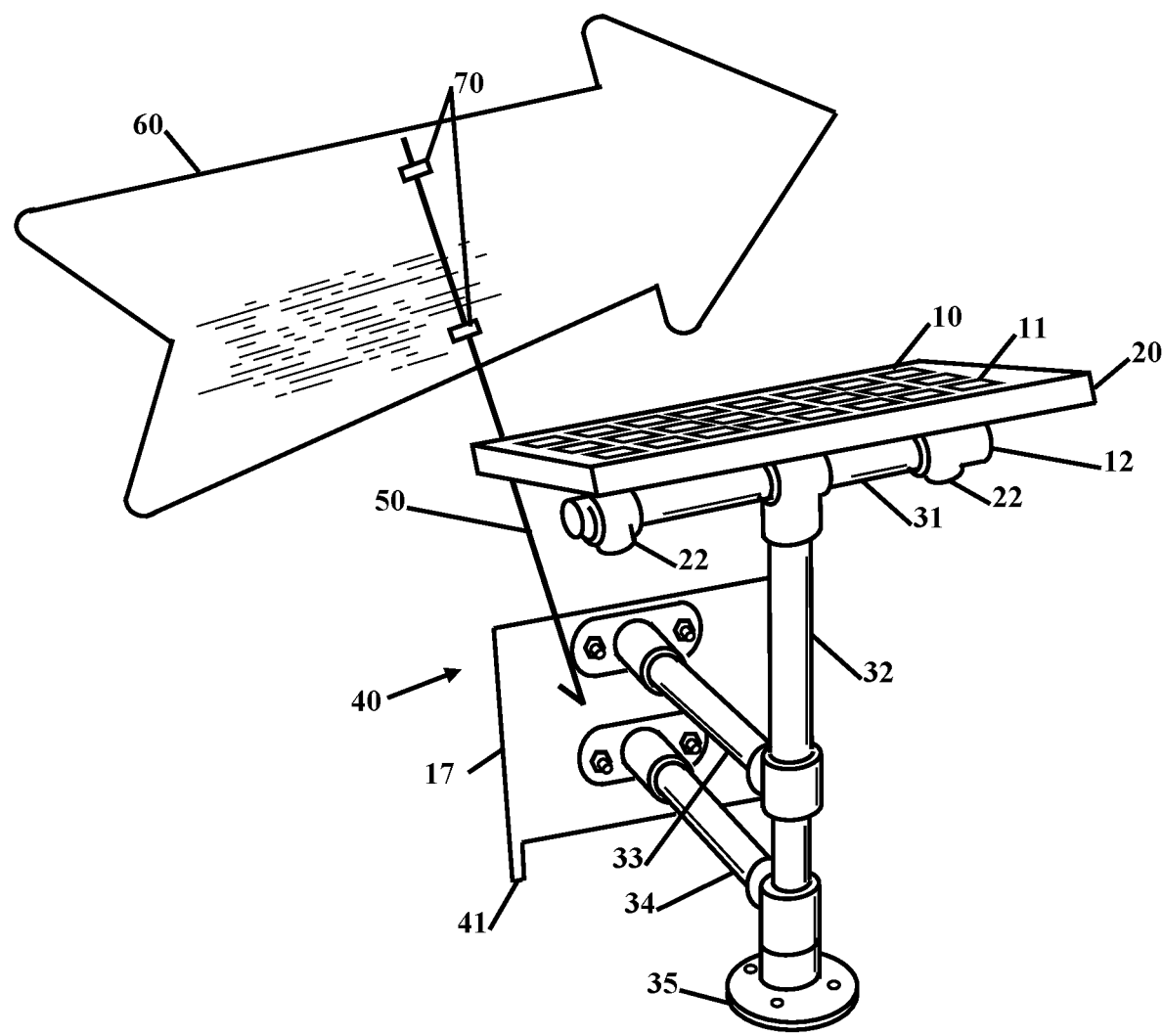
FIG. 1 shows a front perspective view of the solar powered attention sign.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

The solar sign spinner moves advertising signs by converting sunlight to electrical power using a solar panel. The solar panel creates electricity to drive a gear motor. The gear motor is connected to mechanical linkages to cause cyclical motion of an advertising sign to attract attention. The solar sign spinner does the work at a minimal cost and with little human effort or physical injuries.

The solar sign spinner moves the advertising signs without the necessary provisions of the human counterpart such as frequent breaks, risk of injury, cost of a regular salary, tendency toward boredom and diminished morale, etc. The solar sign spinner moves the advertising signs without the necessary provisions of the human counterpart such as frequent breaks, risk of injury, cost of a regular salary, tendency toward boredom and diminished morale, etc.

Humans are not designed for repetitive motions and inhospitable environments. Batteries limit the time of the advertising sign motion before recharging is necessary. The batteries are often heavy making the device difficult to set up and to transport. Electrical cords require attachment to an electrical socket that is not usually available in open spaces were advertising is typically done. Power cords are a trip hazard and an electrical hazard.

The Solar panels makes the solar sign spinner independent of the electrical grid. It moves from a power source that is free. This gives it the freedom to be used in remote locations. The lack of dependency on the power grid makes the device easy to transport and to operate in remote locations. The solar sign spinner can operate as long as there is sunshine. If it happens to stop motion due lack of sunlight, it becomes a garden variety "yard" sign.

Figure 2:
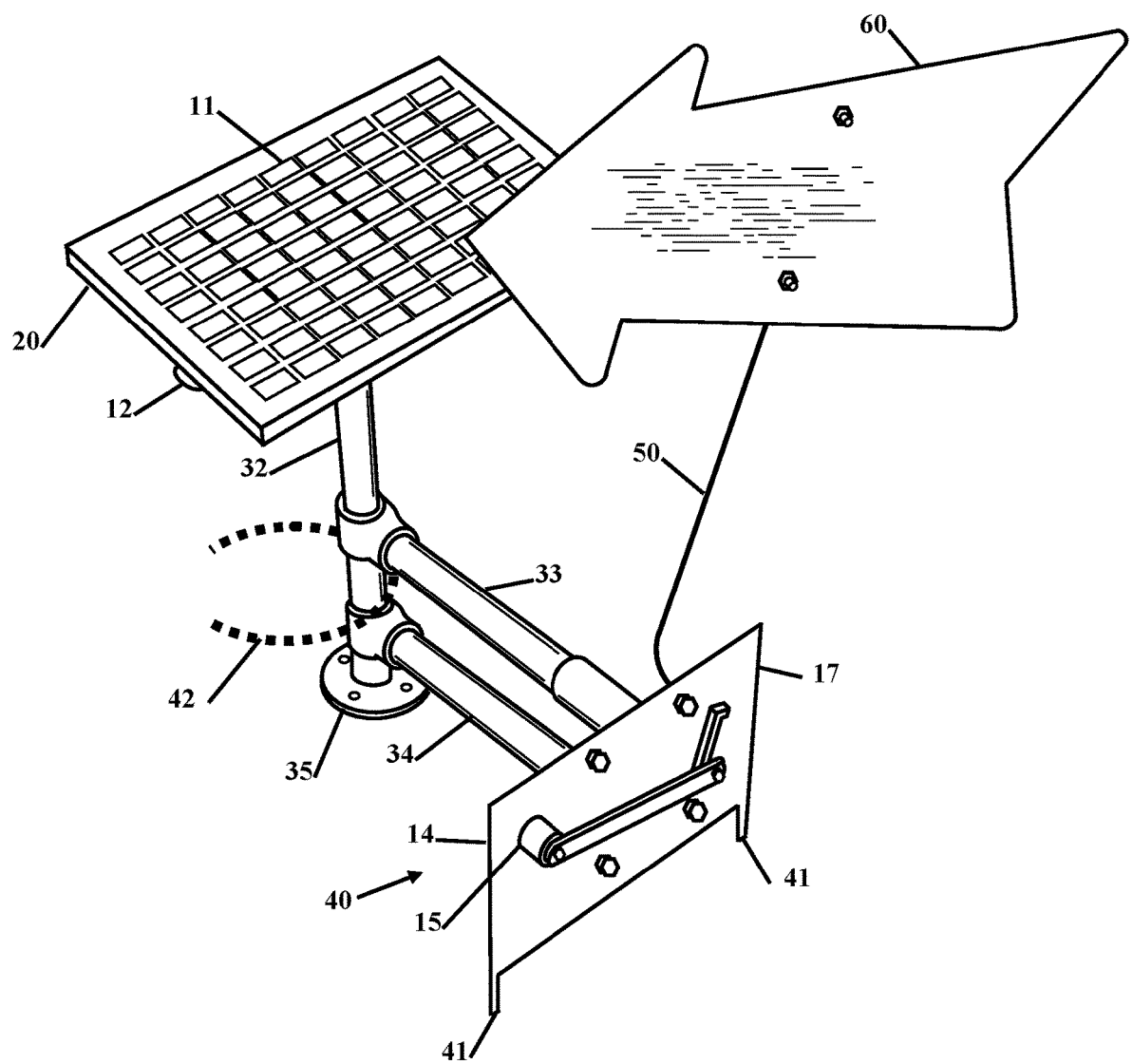
FIG. 2 shows a rear perspective view of the solar powered attention sign.

Item Numbers and Description
  10 solar panel with electrical conductors, power switch, and speed control module
  11 solar panel
  12 power switch
  14 gear motor
  15 speed control module
  16 worm and bull gear set
  17 housing
  20 solar panel mounting plate and brackets
  21 solar panel mounting plate
  22 pillow blocks
  31 horizontal panel member
  32 vertical member
  33 horizontal member
  34 horizontal member
  35 base
  40 motion mechanism
  41 support foot
  42 chain
  50 motion rod
  60 advertising sign
  70 fastener(s)
  80 motion
  81 motor
  82 reduction gearing
  83 rotary disc
  84 pivot
  85 arm
  86 pivot
  87 slot
  88 slider
  89 counter weight Relationship Between the Components:

FIG. 1 shows a front perspective view of the solar powered attention sign and FIG. 2 shows a rear perspective view of the solar powered attention sign. The solar panel mounting plate 20 attaches to the back side of the solar panel 10. Two brackets similar to pillow blocks 22 are mounted inline to the solar panel mounting plate 20 to allow the solar panel mounting plate 20 to rotate around a horizontal tube on top of the solar panel "Tee" tower. The solar panel "Tee" tower has a vertical member 32 that spans from the ground to a horizontal member that forms a "Tee" with the vertical member 32. The horizontal panel member 31 is free to rotate 360 degrees around the vertical member 32. The vertical member 32 of the tower has two other horizontal members 33 and 34 that attach to the motion mechanism panel and support feet 40a and 40b. The motion rod 50 is attached to the motion mechanism panel.

The motion mechanism panel 40 has a housing 17 with two frame support feet 41 on the motion mechanism panel and solar panel tower vertical member 32 form a tripod of support on the ground with base 35. The advertising sign 60 attaches to the motion rod 50 using the advertising sign brackets and fasteners 70.

Method of Operation:

The solar panel 11 is able to rotate about vertical member 32 of the solar panel "Tee" tower and tilt about the horizontal panel member 31 of the panel tower to an angular position that maximizes the sun's rays to generate electricity.

If the power switch 12 is on, the electricity flows from the solar panel 11 to a speed control module 15 then to a gearmotor 14 where it begins to rotate the motor's shaft. The motor's shaft speed is controlled by the speed control module 15. The motor's shaft drives a worm and bull gear set 16 that causes the motion rod 50 to move with reciprocating motion. The advertising sign 60 correspondingly moves with the motion rod 50 because it is attached to the rod with brackets and fasteners 70.

Method of Fabrication:

Attach the solar panel mounting plate to the solar panel 11. Attach one pillow block 22. Temporarily leave the other pillow block 22 unmounted. Assemble the motion support mechanism 40 and motion rod 50 together. Assemble the solar panel "Tee" tower together with horizontal members 33 and 34 with lateral support members to attach to the motion mechanism 40 plate. The combined two subassemblies will stand freely.

To mount the solar panel on to the solar tower, slide the solar panel bracket hole through one side of the horizontal member 31 and tubes such that both ends of the horizontal tube are aligned with the short edges of solar panel 11. While holding the solar panel 11 in position, attach the second pillow block 22 by aligning the bracket center hole with the horizontal tube and sliding the pillow block 22 such that flange holes align with those on the solar panel mounting plate. Insert fasteners through the aligned holes and tighten.

The members in the functional description are essential for the operations of the solar sign spinner. The following elements may be added for safety and additional capability. A cover for the motion mechanism may be added to protect hands from the motion mechanism moving parts. Other motion mechanism panels may be added to change the arm motion from side to side reciprocal motion to up and down reciprocal motion.

Figure 3:
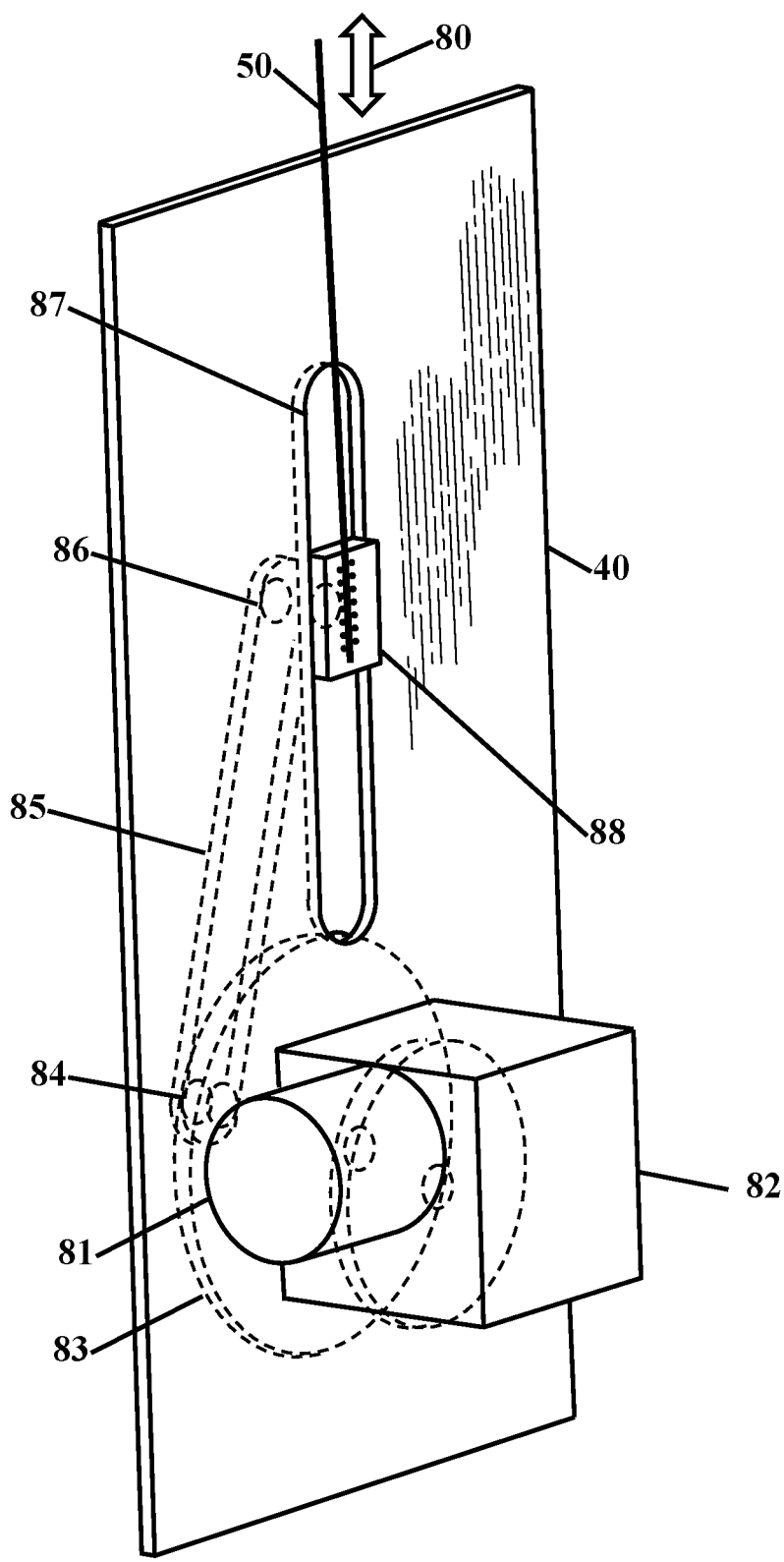
FIG. 3 shows a front perspective view of an optional motor and motion control mechanism.
Figure 4:
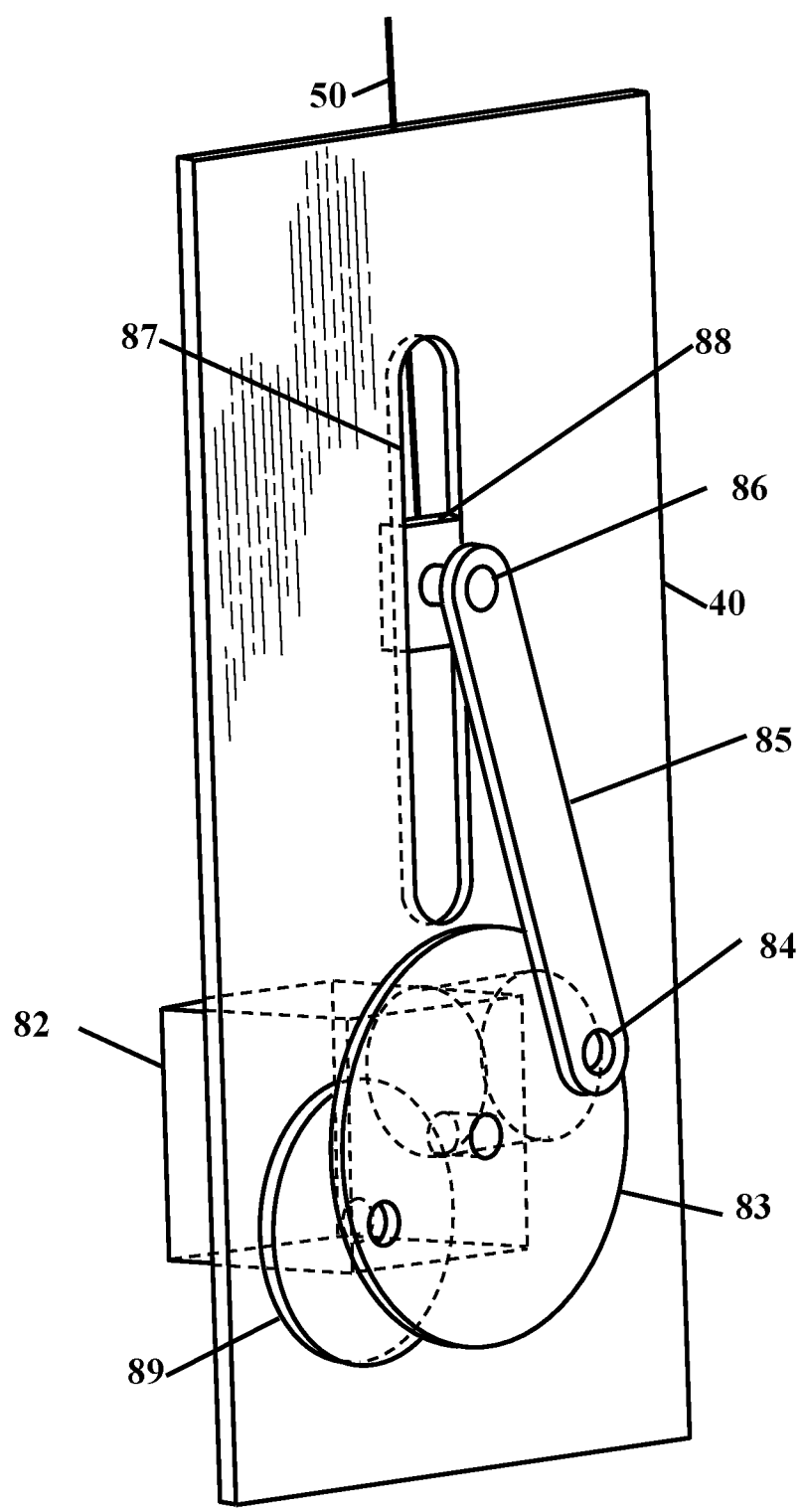
FIG. 4 shows a rear perspective view of the motor and motion control mechanism.

FIG. 3 shows a front perspective view of an optional motor and motion control mechanism and FIG. 4 shows a rear perspective view of the motor and motion control mechanism with a motor-driven vertical reciprocating mechanism with a counterweight 89 as one alternative to the motion mechanism 40. The motion control mechanism in the embodiment shown in these figures show a vertical reciprocating mechanism. The mechanism has a motor 81 that is connected to reduction gearing 82. In this figure, the reduction gearing is connected to a counter weight 89. The last gear is shown as a rotary disc 83 that has a pivot 84 that connects to an arm 85 at a first end of the arm and with a pivot 86 to a slider 88 at the second end of the arm 85. The pivot 86 connects to a slider 88 that moves in a slot 87 that converts rotary motion into linear motion 80. It also contemplated that the movement of the sign is a change in at least one dimension of said sign, such as, but not limited to extending and contracting from opposing sides.

Spikes may be added to the support feet to allow the device to stand on soft dirt. Flanges with drilled holes may be added to all the feet of the solar sign spinner to allow it to be fastened to an anchoring structure using tamper-proof fasteners. The solar panel, motion mechanism, and motor sizes may be re-sized to move larger advertising signs. A counterweight may be added to the motion rod to lower the dynamic forces on the moving parts. Smaller forces on the moving parts will allow them to operate longer without damage and adjustments.

A chain 42 looped through the solar panel tower structure and attached to an anchoring structure will prevent others from stealing the device while it is not being monitored. An optional small battery may be added to supply power when sunlight is blocked by scattered clouds. Battery would be recharged when sunlight is available. The electrical conductors from the solar panel to the motor may be routed through the "Tee" tower and lateral members to protect them from damage. An optional four-legged version of the solar sign spinner may be offered to provide more stability from tipping over for particular applications. The solar motion mechanism panel may be flipped such that the motion rod is placed in front of the sign spinner assembly. This configuration will allow a larger rotation angle of the motion rod.

Method of Use:

Find a conspicuous location where sunshine is available. Position advertising arrow such that its motion may be seen by passersby. Orient the solar panel such that it maximizes sun exposure by rotating the solar panel about its 2 rotational axes. Turn on the power switch. As the sign begins to move, adjust its speed to limit the dynamic forces at the end of its stroke when it reverses direction. Attach a chain through the solar tower body to fasten it to an anchoring structure. It is also contemplated that the motion mechanism can be used as a wiper to clean solar panels or to do other work, for example, the solar "Tee" tower and motion panel provides and an ideal structure mounting other powered devices such as an air compressor for use in remote locations. An advanced version of the "Tee" tower is contemplated as having the ability to follow the Sun by controlling motors to rotate the solar panel about the vertical member 32 and horizontal member 31. A light sensor such as a photodiode is contemplated for regulating the sign spinner speed control for the advanced version of the "Tee". The light sensor feature would eliminate the need for manual speed adjustment for varying light conditions.

Thus, specific embodiments of a solar powered attention sign have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A solar powered attention sign comprising:
   a base;
   a vertical member extending vertically from said base with at least one horizontal support member that extends horizontally from said vertical member that connects to a housing that is offset from said vertical member;
   a said housing contains a motor, a transmission and a motion mechanism;
   said vertical member further includes a mounting for a solar panel;
   said solar panel is electrically connected to said motor, and
   a first end of a flexible motion rod connects said motion mechanism whereby said motion mechanism imparts movement to said flexible motion arm and to a sign that is connected to a second end of said flexible motion arm.

2. The solar powered attention sign according to claim 1, wherein said sign is in the shape of an arrow, a hand, a rectangle, a silhouette, a round, a diamond, an octagon, or a triangle.

3. The solar powered attention sign according to claim 2, wherein said sign is secured to said flexible motion rod with at least one fastener.

4. The solar powered attention sign according to claim 3, wherein said sign is configured to be manually rotate around said flexible motion rod on said fastener.

5. The solar powered attention sign according to claim 1, wherein said movement of said sign is a change in at least one dimension of said sign.

6. The solar powered attention sign according to claim 5, wherein said movement is with a slider in a slot that converts rotary motion into linear motion to change said at least one dimension of said sign.

7. The solar powered attention sign according to claim 6, further includes a counter weight that is configured to offset said linear motion.

8. The solar powered attention sign according to claim 1, wherein said movement is side-to-side, up and down, spin, elliptical or a combination thereof.

9. The solar powered attention sign according to claim 1, further includes a battery.

10. The solar powered attention sign according to claim 1, wherein said solar panel connects to said frame with a horizontal panel member.

11. The solar powered attention sign according to claim 10, wherein said connection of said solar panel to said horizontal panel member allows said solar panel to rotate on said horizontal panel member.

12. The solar powered attention sign according to claim 11, wherein said horizontal panel member connects to a vertical member.

13. The solar powered attention sign according to claim 12, wherein said connection of vertical member to said horizontal panel member allows said solar panel to be rotated around said vertical member.

14. The solar powered attention sign according to claim 1, wherein there is at least a second horizontal support member is secured between said vertical member and to said housing.

15. The solar powered attention sign according to claim 14, whereby said at least two horizontal support members connect to said housing thereby forming a rectangular opening between said at least two horizontal support members, said housing and said vertical member.

16. The solar powered attention sign according to claim 15, wherein said rectangular opening provides a fastening system for securing therethrough to anchor said solar powered attention sign.

17. The solar powered attention sign according to claim 1, further includes a power switch and/or a speed control.

18. The solar powered attention sign according to claim 1, further includes a counterweight.

19. The solar powered attention sign according to claim 1, further includes a slider in a linear track that is connected to said flexible motion rod or is connected to said sign when said motion mechanism combines at least one of linear motion and rocking motion.

\* \* \* \* \*